Feb. 7, 1950           J. S. GILBEY           2,496,388
LOG LOADING AND UNLOADING DEVICE FOR VEHICLES
Filed May 7, 1948           3 Sheets-Sheet 1
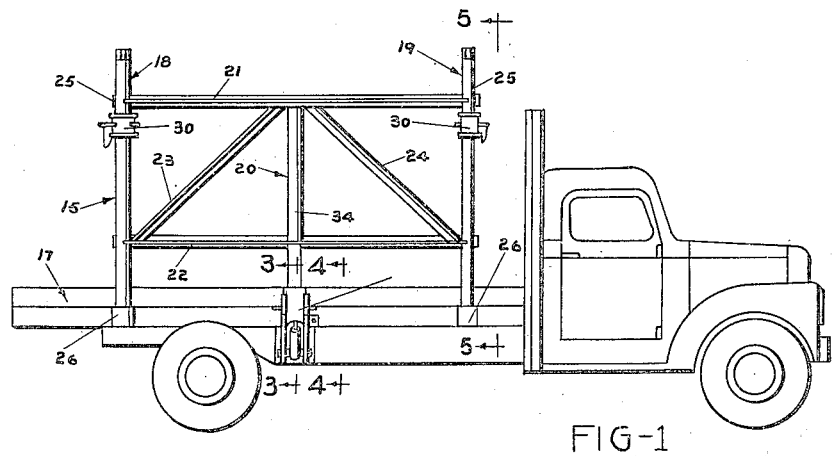
FIG-1
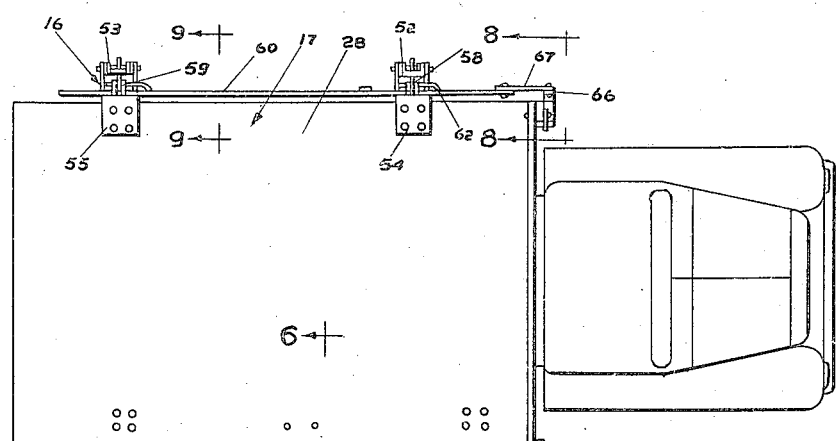
FIG-2
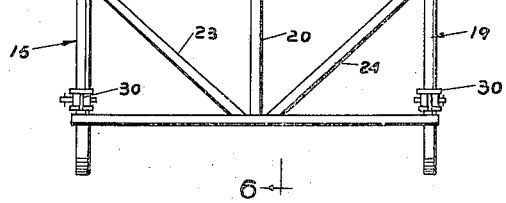

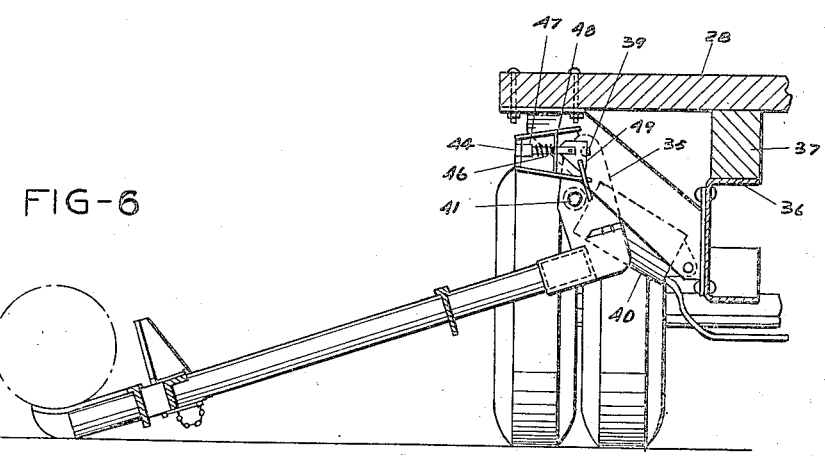

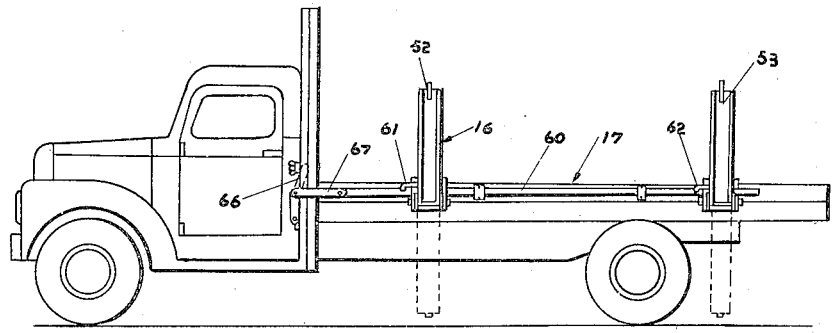
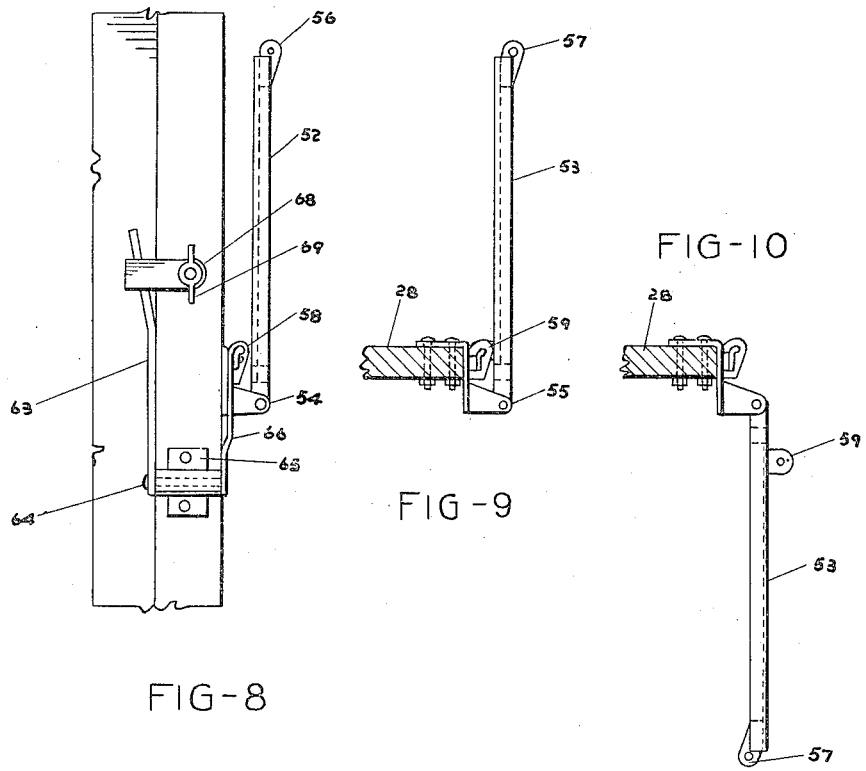

Patented Feb. 7, 1950

2,496,388

UNITED STATES PATENT OFFICE 2,496,388

LOG LOADING AND UNLOADING DEVICE FOR VEHICLES

John Samuel Gilbey, Fredericton, New Brunswick, Canada, assignor to Horsnell's Machine and Iron Works, Ltd., Fredericton, New Brunswick, Canada Application May 7, 1948, Serial No. 25,697
In Canada February 20, 1947

1 Claim. (Cl. 214—77)

The invention relates to improvements in log loading and unloading devices for vehicles as described in the present specification and illustrated in the accompanying drawings that form a part of the same.

The invention consists essentially of the novel features of construction as pointed out broadly and specifically in the claim for novelty following a description containing an explanation in detail of an acceptable form of the invention.

The objects of the invention are to provide a device which will facilitate the loading of logs and the like on a vehicle; to devise a log loading device which will raise logs from the ground surface and place same on a truck, trailer, sleigh or any other vehicle; to construct a log loading device which is operated by hydraulic pressure; to provide a log loading device which can be easily mounted on any standard truck or vehicle; to devise a log loading device which can be easily mounted on either side of a truck body; to construct a log loading device having few parts and inexpensive to manufacture; to provide an unloading device that will facilitate the removal of logs and the like from a truck or other vehicle; to devise a log loading and unloading device which will not occupy load space on the body of a truck; and generally to provide a log loading and unloading device which will be durable, dependable and efficient for its purpose.

In the drawings:

Figure 1 is a side view of the log loading device in an upright position on the body of a truck.

Figure 2 is a plan view showing the loading device in a downward position and the unloading device in an upright position on the body of a truck.

Figure 3 is a sectional view as taken on the line 3—3 in Figure 1.

Figure 4 is a sectional view as taken on the line 4—4 in Figure 1.

Figure 5 is an end view of the loading device as taken on the line 5—5 in Figure 1.

Figure 6 is a sectional view as taken on the line 6—6 in Figure 2.

Figure 7 is a side view of the unloading device in an upright position on the body of the truck.

Figure 8 is an end view of the unloading device as taken on the line 8—8 in Figure 2.

Figure 9 is a sectional view as taken on the line 9—9 in Figure 2.

Figure 10 is a sectional view similar to Figure 9 showing the unloading arms in a downward position.

Like numerals of reference indicate corresponding parts in the various figures.

Referring to the drawings, the log loading device and the unloading device are indicated by the numerals 15 and 16 respectively, and are adapted to be mounted on the opposite sides of the truck body 17. The loading device 15 and the unloading device 16 form the stakes for the truck body 17 when the same are secured in an upright position with respect to the body 17. The method of mounting these loading and unloading devices 15 and 16 permit a full pay load to be carried on the truck body 17.

The loading device 15 consists of the end sections or end members 18 and 19 and the centre section or centre member 20 which are pivotally secured to the truck body 10. These end sections 18 and 19 and centre section 20 are suitably secured to one another by the longitudinal members 21 and 22. The diagonal braces 23 and 24 are secured to the longitudinal members 21 and 22 thus holding the entire frame of the loading device 15 square and substantially maintaining the shape of same. In this instance the longitudinal members 21 and 22 are T-shaped and the body portion of same has the ends cut-out so as to fit over the arm 25 of each of the end sections 18 and 19. The centre section 20 abuts the longitudinal member 21, and the longitudinal member 22 has a hole in the body portion of same through which this centre section extends.

The end sections 18 and 19 each consist of an arm 25 which, in this instance, is tubular and has one end thereof fixedly secured in the movable support 26. The brackets 27 are fixedly mounted on the under side of the floor 28 of the truck body 17 and provide a means of pivotally mounting each of these movable supports 26.

The end sections 18 and 19 each have a shoe 29 mounted on the free end of the arm 25. The upper surface of this shoe 29 is slightly turned up on the end thereof so as to accommodate a log thereon. Each of the arms 25 have a sliding bracket 30 slidably mounted thereon. This sliding bracket 30 is equipped with a chain 31 and eyebolt 32. The arm 25 has the holes 33 suitably located in same and in which the eye bolt 32 may be inserted to secure the sliding bracket 30 in the desired position thereon.

The centre section 20 consists of the arm 34 which in this instance is tubular, and has one end thereof fixedly secured in the support arm 35. The channel member 36 is suitably secured on the under side of the floor beam 37 of the truck body 17. The support brackets 38 are fixedly secured to the channel members 36 and the under side of the floor 28 of the truck body 17. The support arm 35 is L-shaped and the end thereof is pivotally mounted on the pin 39 which, in turn, is mounted in the support brackets 38.

The hydraulic cylinder 40 is pivotally mounted on the pin 41 which is secured in the lower portion of the support brackets 38. The piston 42 is slidably fitted in the cylinder 40 and adapted to be operated by hydraulic pressure. The piston rod 43 which forms a part of the piston 42 has the free end of same pivotally connected to the support arm 35. The piston rod 43 is adapted to hinge the support arm 35 upward and downward on its pivot point so as to raise and lower the arm 34, thus operating the loading device 15.

The locking mechanism for securing the loading device in an upright position on the truck body 17 consists of the lock bolt 44 which is slidably mounted in the bracket 45. This bracket 45 is fixedly secured to the support brackets 38. The compression spring 46 encircles the lock bolt 44 and bears against the shoulder 47 of same. This bracket 45 has the partition 48 in same through which the lock bolt 44 extends, and the other end of the compression spring 46 bears against the same. The cam 49 is pivotally mounted in the slot in the lock bolt 44 and adapted to bear against the outer face of the partition 48. The lever 50 is fixedly secured on the cam 49 and adapted to be manually operated. The catch plate 51 is welded or otherwise secured on the support arm 35 and has a hole suitably located in same so as to engage the lock bolt 44 when the loading device 15 is in an upright position on the truck body 17.

The unloading device 16 consists of the front arm and rear arm 52 and 53 respectively. The support brackets 54 and 55 are fixedly secured to the floor 28 of the truck body 17 and having the arms 52 and 53 pivotally secured thereto. In this instance these front and rear arms 52 and 53 are in the form of a channel and have the lugs 56 and 57 welded or otherwise secured at the free ends thereof. The lugs 56 and 57 each have a hole in the end of same so as to facilitate tying the arms 52 and 53 to the end sections 18 and 19 of the loading device 15.

The retaining lugs 58 and 59 are fixedly secured on the front and rear arms 52 and 53 respectively. These retaining lugs 58 and 59 are suitably located towards the pivot point of the arms 52 and 53, and each have a hole in the central portion of same. The longitudinal lock bar 60 is slidably mounted on the outer edge of the floor 28 of the truck body 17. This lock bar 60 has the lock pins 61 and 62 welded or otherwise secured thereto. These lock pins 61 and 62 are suitably shaped so that the body portions of same are parallel with the lock bar 60 and spaced a suitable distance out from the same.

The lever is fixedly secured to the pin 64 which in turn is rotatably mounted on the truck body 17 by means of the bracket 65. The link 66 is fixedly secured on the outer end of this pin 64 and adapted to turn in the same arc as that of the lever 63. The connecting link 67 is pivotally secured to the link 66 and the longitudinal lock bar 60. The catch 68 is pivotally mounted on the truck body 17 and adapted to be secured in any suitable position by means of the thumb screw 69.

In the operation of the foregoing the loading device 15 is lowered to the ground level and a log or other elongated member is rolled over the shoe 29 on each of the end sections 18 and 19. The piston 42 in the cylinder 40 is then pushed forward by hydraulic pressure and the piston rod 43 hinges the support arm 35 upward thus raising the loading device 15 to an upright position. The slide bracket 30 on the end sections 18 and 19 is slidably adjusted so as to hold the log in the desired position thereon during the raising of the same. When the truck body 17 has been loaded the loading device 15 is retained in an upright position by manually turning the lever 50 and cam 49 so that the latter permits the compression spring 46 to push the lock bolt 44 forward with respect to the bracket 45, thus engaging the hole in the catch plate 51. The loading device may be released in a reverse manner as that hereinbefore described by manually turning the lever 50 and cam 49 so that the latter draws the lock bolt 44 inward from the catch plate 51, thus permitting this loading device to be lowered from its upright position.

In the operation of the unloading device 16, the front and rear arms 52 and 53 are retained in an upright position on the truck body 17 by means of the lock pins 61 and 62 which engage the holes in the retaining lugs 58 and 59 respectively. In unloading the truck the front and rear arms 52 and 53 are hinged downward so as to facilitate the removal of the load therefrom. In this respect the catch 68 is turned so as to release the lever 63 and the latter is tilted downward. The movement of this lever 63 in cooperation with the pin 64, link 66 and connecting link 67 draws the longitudinal lock bar 60 forward. As this lock bar 60 is drawn forward the lock pins 61 and 62 which are fixedly secured to same disengage the holes in the retaining lugs 58 and 59, thus retaining same and permitting the arms 52 and 53 to hinge downward.

What I claim is:

In log loading and unloading devices for vehicles, a vehicle body, a loading device pivotally secured to one side of said body, hydraulic means for raising and lowering said loading device, a locking mechanism for securing the loading mechanism in an upright position, an unloading device having arms pivotally secured to the opposite side of said vehicle body, a lever pivotally secured to said vehicle body, a lock bar controlling the movements of said arms, links connecting said lock bar to said lever, and a catch adapted to engage and release said lever.

JOHN SAMUEL GILBEY.

REFERENCES CITED

The following references are of record in the file of this patent:

UNITED STATES PATENTS

| Number | Name | Date |
|---|---|---|
| 2,234,599 | Johnston | Mar. 11, 1941 |
| 2,359,287 | Bouffard | Oct. 3, 1944 |
| 2,468,095 | Messick | Apr. 26, 1949 |

FOREIGN PATENTS

| Number | Country | Date |
|---|---|---|
| 97,891 | Sweden | Jan. 23, 1940 |
| 101,792 | Sweden | June 10, 1941 |